United States Patent [19]
Boyce

[11] 3,868,825
[45] Mar. 4, 1975

[54] APPARATUS FOR WORKING FROZEN GROUND

[76] Inventor: Jack R. Boyce, 442 S. 7th West, Tremonton, Utah 84337

[22] Filed: Jan. 26, 1973

[21] Appl. No.: 327,169

[52] U.S. Cl. .............................. 61/36 A, 126/271.1
[51] Int. Cl. ........................ E02d 3/00, F24c 15/30
[58] Field of Search .......... 61/36 A, 16; 126/271.1; 52/742; 404/95; 138/103, 105; 272/3; 264/DIG. 43

[56] References Cited
UNITED STATES PATENTS

| | | | |
|---|---|---|---|
| 599,606 | 2/1898 | Harris | 61/36 A |
| 623,598 | 4/1899 | Francis | 126/271.1 |
| 832,617 | 9/1906 | Hummel | 61/16 |
| 1,021,529 | 3/1912 | Johnson | 126/271.1 |
| 1,131,378 | 3/1915 | Hill | 126/271.1 |
| 1,465,652 | 8/1923 | Moore | 126/271.1 |
| 1,889,268 | 11/1932 | Sorensen | 264/31 |
| 2,262,704 | 11/1941 | Tompkins et al. | 126/271.1 |
| 3,324,846 | 6/1967 | Smith | 126/271.1 |
| 3,649,725 | 3/1972 | Olson | 264/DIG. 43 |
| 3,658,124 | 4/1972 | Tippmann | 272/3 |
| 3,758,748 | 9/1973 | Reid | 272/3 |

FOREIGN PATENTS OR APPLICATIONS

| | | | |
|---|---|---|---|
| 290,648 | 6/1965 | Netherlands | 47/32 |

Primary Examiner—Paul R. Gilliam
Assistant Examiner—Alex Grosz

[57] ABSTRACT

Frozen ground is thawed for trenching by placing an open-bottomed duct over the area to be trenched, and by causing hot air to flow unidirectionally through and along the length of the duct in traveling contact with the ground. Sealing means are preferably provided to prevent leakage of the circulating hot air from the edges of the duct. The spent air may be released to the atmosphere or it may be reheated and recirculated. If the trenching is used for construction involving the laying of concrete, the method and apparatus of the invention may be employed to maintain a warm temperature for normal setting and curing of the concrete.

1 Claim, 7 Drawing Figures

APPARATUS FOR WORKING FROZEN GROUND

BACKGROUND OF THE INVENTION

1. Field:

The invention has to do with methods of working frozen ground by thawing and trenching for construction purposes, for gaining access to buried utilities, etc.

2. State of the Art:

The simplest method employed heretofore for thawing frozen ground has been the building of a fire on the ground, but this is very inefficient. Various types of apparatus have been proposed for applying heat onto or into frozen ground, see for example U.S. Pat. Nos. 610,048; 620,112; 632,388; 702,924; and 3,293,863. For one reason or another, none of these have had any widespread acceptance by the construction industry which has generally been forced by freezing weather to postpone trenching until thawing takes place naturally.

SUMMARY OF THE INVENTION

According to the invention, an open-bottomed duct is placed over the area to be thawed. Such duct is normally made up of a plurality of elongate sections placed end to end, or placed side-by-side with their ends communicating with header sections, depending upon the size and shape of the area to be thawed. Hot air is forced through the duct in contact with the ground, so the ground is heated and moisture released by the thawing is vaporized and carried away. The moisture-laden air may be discharged to the atmosphere after its travel through the duct, being replaced with fresh, relatively dry air, or, if still capable of picking up moisture, it may be reheated and recirculated. It will ordinarily be desirable to seal the edges of the duct that rest on the ground. This can be done in various ways, the simplest being to pile earth or sand along such edges. When thawing is completed, the ductwork is removed and trenching carried out. If a concrete foundation is to be laid, the ductwork is replaced after pouring of the concrete, utilizing protective risers as may be necessary to close off any gaps that may exist between the ground and the lower edges of the duct sections by reason of the height of the cast concrete. The forcing of hot air through the ductwork, as for the ground-thawing operation, will protect the wet concrete from freezing before setting and will facilitate both setting and curing.

THE DRAWINGS

Specific embodiments representing the best mode presently contemplated of carrying out the invention are illustrated in the accompanying drawings, in which:

FIG. 1 is a top plan view showing a typical duct system of the invention in place over frozen ground to be thawed for trenching in preparation for the construction of a foundation for a building, intermediate portions being broken out for convenience of illustration;

FIG. 2, a fragmentary perspective view, partly in transverse vertical section taken on the line 2—2 of FIG. 1 and drawn to a larger scale;

FIG. 3, a fragmentary, longitudinal vertical section taken on the line 3—3 of FIG. 1 and showing, in side elevation, a forced blast heater arrangement adapted to heat and circulate air within the duct, the view being drawn to the larger scale of FIG. 2;

FIG. 4, a view similar to that of FIG. 2 but showing the duct reinstalled in elevated position over a concrete foundation newly poured in forms constructed in a trench dug in the ground thawed by the system of FIG. 1, such concrete being protected against freezing during the setting and curing stages;

FIG. 5, a fragmentary view in side elevation of a duct system similar to that of FIG. 1 but wherein the forced blast heaters are arranged to draw cold atmospheric air from outside the duct and force it into the duct after heating and to discharge moisture-laden air from the duct in advance of fresh air introduction;

FIG. 6, a perspective view of another embodiment of duct system covering an entire rectangular area to be excavated and made up of double-passage duct sections placed end-to-end and side-by-side, with headers at opposite ends, an intermediate portion being broken out for convenience of illustration; and FIG. 7, a transverse vertical section taken along the line 7—7 of FIG. 6.

DETAILED DESCRIPTION OF THE ILLUSTRATED EMBODIMENTS

Figure 1:
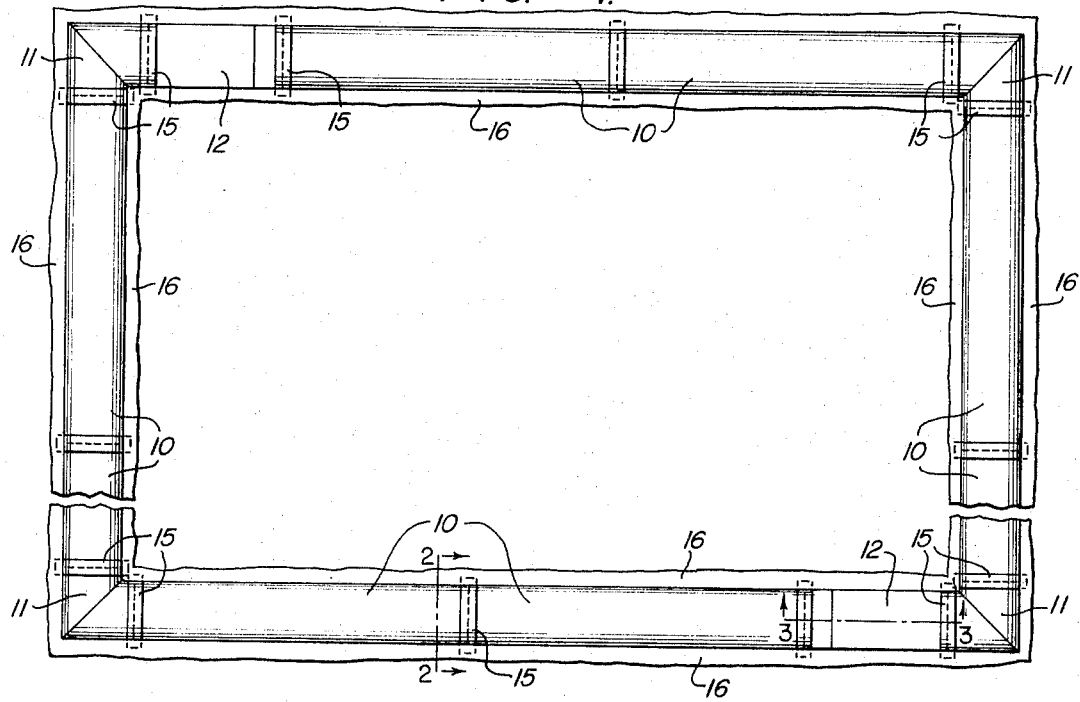
Figure 2:
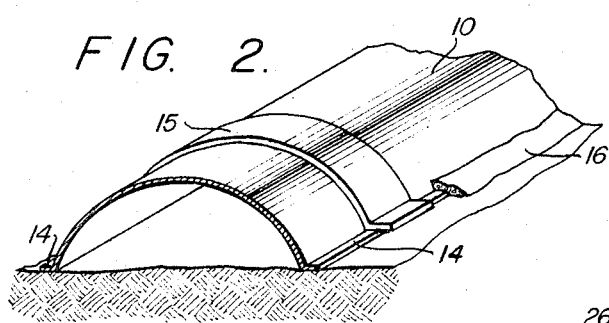
Figure 3:
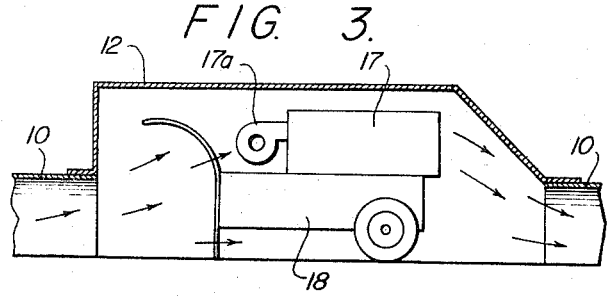

In the embodiment of FIGS. 1–3, the duct system extends as a closed, rectangular loop to thaw ground for trenching and the eventual installation of a continuous concrete foundation for a building. Elongate duct sections 10, corner sections 11, and heating and circulating sections 12, preferably supplied in multiple as modular units, are placed together end-to-end over the ground to be thawed. Although a rectangular configuration is shown, any combination of these or sections of different shapes and sizes can be used to make a ductwork system of any desired configuration. Also, the duct sections 10 and 11 can be used with one or more heating and circulating sections 12 to thaw along a straight, curved, or irregular line, such as might be needed for digging up buried utilities.

As illustrated, the duct sections 10 and 11 are semi-circular in cross-section with open bottoms and laterally extending flanges, 14, FIG. 2. They may be made of sheet metal, such as aluminum or galvanized steel, or some other suitable material, such as fiberglass or plastic. They may be covered exteriorly or interiorly with heat-insulating material (not shown) and interiorly with a vapor barrier film of some kind (also not shown) though this is not necessary. While the ducts are illustrated as semi-circular in cross-section, other configurations can be employed. The several sections abut end-to-end, and the joinders therebetween are usually covered with correspondingly configurated strips 15 as closures, or, when made relatively heavy, as both closure and hold-down strips.

The longitudinal edges of the duct are advantageously provided with sealing means substantially preventing loss of hot air from between the flanges 14 and the ground upon which they rest. A convenient sealing means comprises sand or soft unfrozen earth 16 piled upon and along the longitudinal flanges 14. Other sealing means, e.g., flexible sheet material attached to the flanges 14 or laid thereupon and held down by material or weights piled thereon, or strips of inflatable tubing laid along the ground with the duct sections resting thereon, may be employed.

In the particular form shown, each heating and circulating section 12, see particularly FIG. 3, is of sufficient height to accommodate a suitable forced air heater 17, which may be of any standard type or designed specifically for the purpose and which may burn gas, oil, or other fuel, although electrical heating means are more desirable. Such heater may be advantageously mounted on a push cart 18, as shown, for ready portability and is provided with a blower 17a and preferably with standard temperature controls (not shown). Blower 17a pulls air into the heater and discharges it forcibly as indicated by the appended arrows, thereby establishing forced circulation of air around the closed loop of the duct system. Any number of these heaters can be utilized, depending upon the distance the air must travel along the duct system.

If the heaters burn fuel, consuming oxygen and giving off waste gases, they may be provided with air intakes and gas offtakes (not shown) leading from and to the atmosphere, although in some instances it may be desirable to discharge the hot gases directly into the duct system for circulation with the air and to provide for bleeding fresh air into the system at intervals along its length to sustain combustion. Electrical heating will, of course, eliminate any problems from this standpoint.

The hot air passing over and in contact with the ground acts to thaw the ground and to pick up moisture that is given off in the thawing process. The ductwork may be vented as desired both to control the pressure within and to eliminate moisture.

Figure 5:
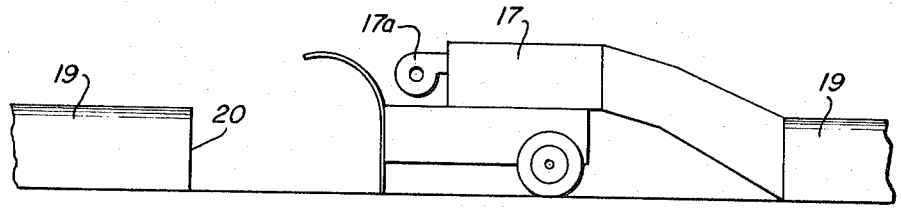

In instances in which there is so much moisture that the circulating air becomes saturated and it is impractical to employ the closed system of FIGS. 1-3, the system may be arranged as in FIG. 5, wherein the blower 17a of the heater 17 is open to the atmosphere and the forced air discharge is connected directly by a conduit 18 to the ductwork 19. Thus, fresh air is constantly drawn in, and, after heating, is passed into and through the ductwork. Such ductwork discharges directly to atmosphere at the next heating and circulating section, as indicated at 20.

It has been found that the addition of a small amount of common salt spread over the ground beneath the duct will hasten the thawing process, particularly where the ground has a high moisture content. As is well known, salt lowers the freezing point of water, and this, in addition to the heat applied through the duct, will cause the superficial ice to melt and the salt to go into solution, which will facilitate the thawing process at lower levels in the frozen ground. When the water vaporizes due to the heat in the duct, the salt will crystalize and remain in the ground as a deterrent to refreezing.

Figure 4:
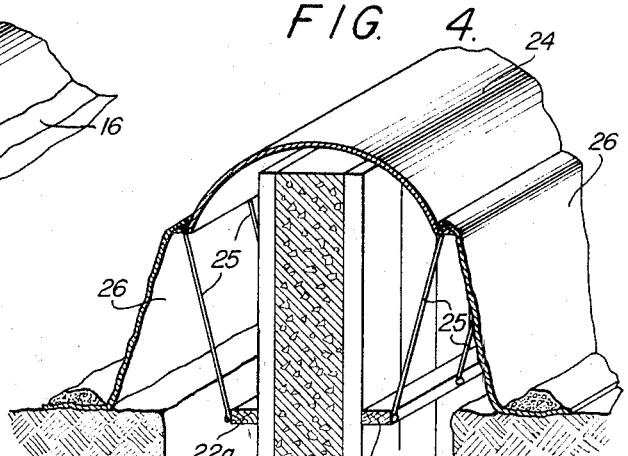

The method and apparatus described above may also be advantageously used to maintain a warm temperature around newly poured concrete to allow proper setting and curing and prevent freezing. Thus, after excavating the thawed ground in any suitable manner, constructing forms, as at 22, FIG. 4, and pouring the concrete 23, the ductwork, here indicated 24, is re-erected over the newly poured concrete foundation structure. The ducts may be supported by tie rods 25, which are fastened to appropriate form members 22a, and protective risers, such as sheets 26 of flexible material, are attached along the longitudinal edges of the ductwork so as to extend down to ground level for sealing against the escape of the heated air as in FIGS. 1 and 2. Heated air may be introduced into the so-erected ductwork in any suitable manner, as from the forced air heaters 17 arranged (not shown) to discharge air into such ductwork.

Figure 6:
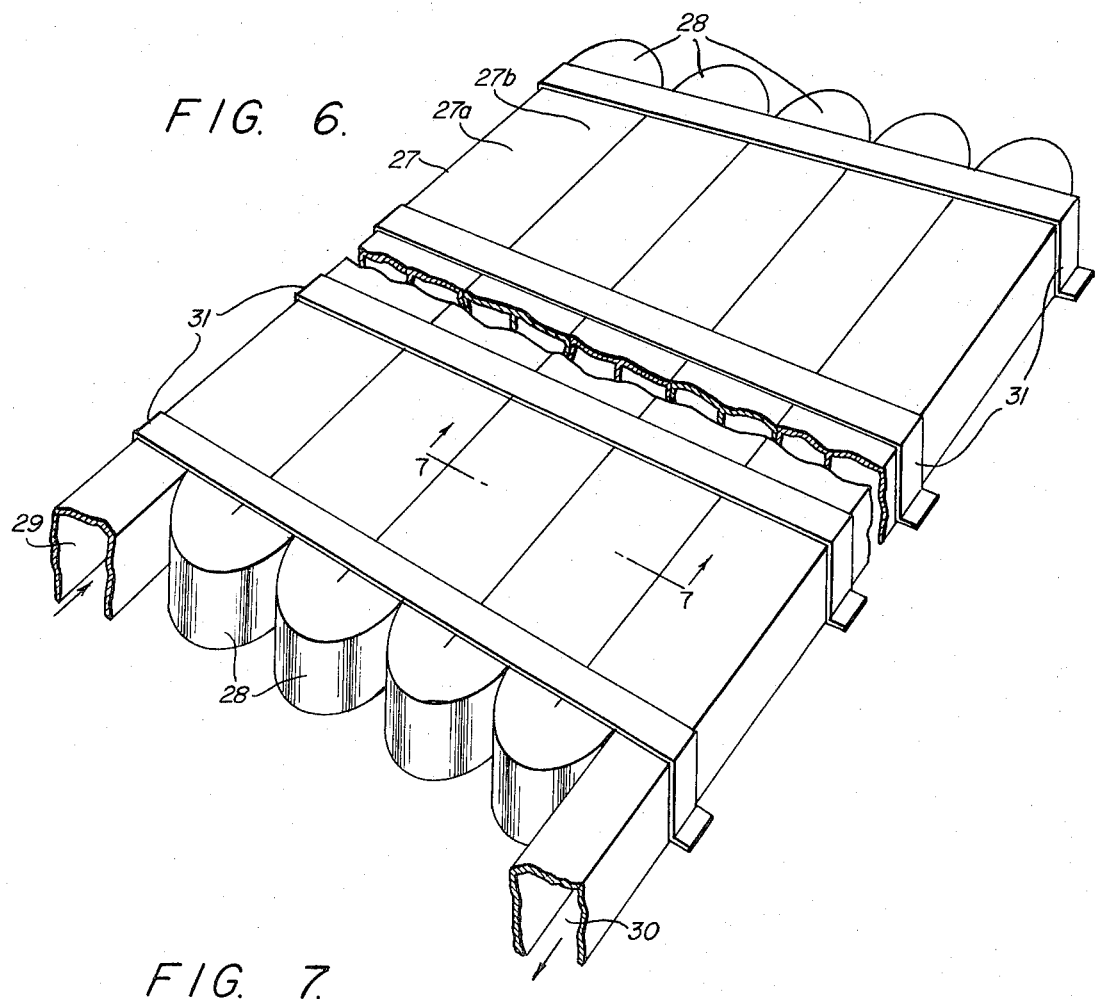
Figure 7:
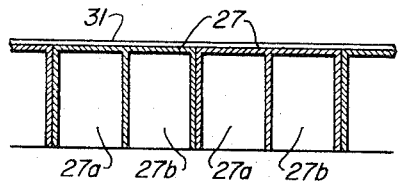

In instances where broad areas of ground must be thawed, duct sections 27, FIGS. 6 and 7, having double passageways 27a and 27b, may be placed end to end and side by side and connected to header sections 28 at opposite ends of the system in the staggered manner shown to provide a serpentine passage for the back and forth flow of heated air (introduced at 29 and discharged at 30) over the entire area to be thawed. Closure and hold down strips 31, corresponding to the strips 15, may be provided as in the embodiment of FIGS. 1-3. Multiple forced blast heating units may be introduced at advantageous points in the system to obtain optimum heating and circulation.

Whereas the invention is here illustrated and described with particular reference to embodiments constituting the best mode presently contemplated of carrying it out in actual practice, other embodiments are possible without departing from the inventive concepts disclosed.

I claim:

1. Apparatus for thawing frozen ground, comprising an elongate, open-bottomed duct for placement on frozen ground with its open bottom facing said ground; means for substantially sealing the longitudinal margins of said duct to substantially prevent the escape of heated air flowing through said duct; and means in flow communication with said duct for blowing heated air through and along the length of the duct unidirectionally in traveling contact with said ground, said duct being made up of a plurality of substantially parallel, elongate, duct sections lying substantially contiguously side-by-side, and a plurality of end sections at opposite ends of said duct sections interconnecting a flow channel of one of said duct sections with a contiguous flow channel of a next adjacent duct section.

* * * * *